Oct. 27, 1936.   G. F. BRADY ET AL   2,059,082
SERVOMOTOR
Filed Dec. 26, 1934   2 Sheets—Sheet 1
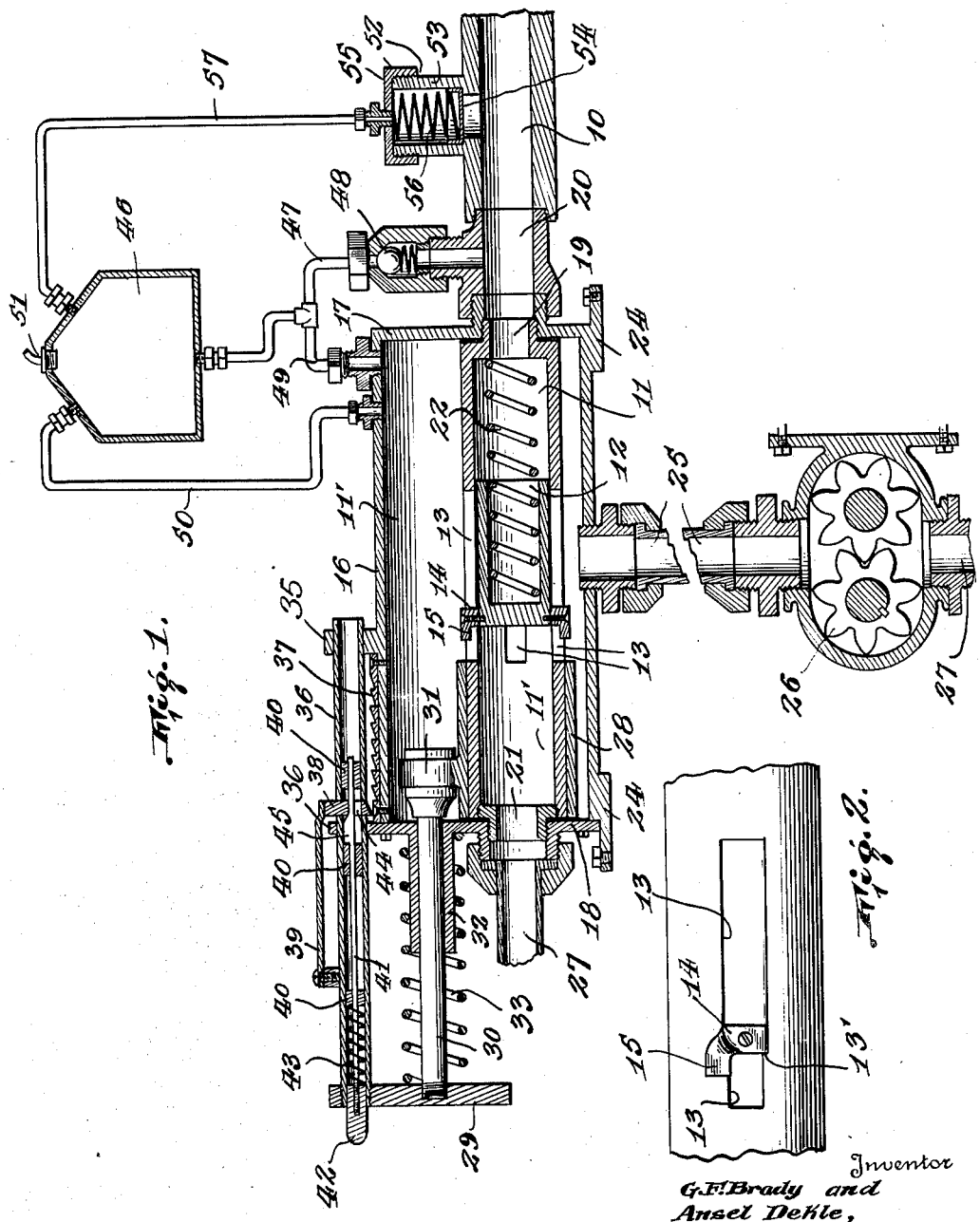
Inventor
G. F. Brady and
Ansel Dekle,
By Christian L. Nielsen.
Attorney Inventor
G. F. Brady and
Ansel Dekle
By Christian R. Nielsen,
Attorney Patented Oct. 27, 1936

2,059,082

UNITED STATES PATENT OFFICE 2,059,082

SERVOMOTOR

George F. Brady and Ansel Dekle, Pearl City, Territory of Hawaii

Application December 26, 1934, Serial No. 759,298

5 Claims. (Cl. 121—41)

The invention relates to servo motors for general applications of certain functions, and particularly has herein been adapted to use for the operation of motor vehicle brakes, from which other uses may be understood.

The invention has for an object to provide a simple and inexpensive power-operated brake or other motor, in which force may be applied in proportion to movement of a control member manually or pedally operated, or operated otherwise. At the same time it is an important object to so construct the appliance that no abrupt or excessive action will be produced. Another important object is to so construct the invention for brake or other use that maximum force applied may be limited to a predetermined degree, and whereby adjustment of this limit may be easily effected.

Another important advantage of the invention is the application of force with a modulated effect proportionate to the emergency need. Thus, in a motor vehicle, when moving at slow speeds a relative small force will effect its stoppage, while at high speeds much greater force may be required. At the same time the limit of maximum force will operate to prevent locking of the wheels of a motor vehicle in ordinary applications, and the device may be adjusted to avoid such locking entirely, if desired. It is also an advantage to provide such a device, which, while requiring no considerable effort on the part of the operator, will yet be free from liability of excessive braking action in application movements.

Additional objects reside in specific refinements of the mechanism, as for instance, a novel means for controlling the maximum force. Also a novel organization for enabling sustained action at full maximum, even should there be loss of efficiency by wear, lost motion, or leakage, without requiring other than the normal operation by the user.

It is also an important aim to present such a device equally effective and adaptable to use on both hydraulic and lever-operated or other brakes.

Additional objects, advantages and features of invention reside in the construction, arrangement and combination of parts involved in the embodiment of the invention as will be understood from the following description and drawings, wherein Figure 1 is a vertical section of one embodiment of the invention on the axis of the main cylinder and control parts.

Figure 2 is a detail of the piston valve.

Figure 3:
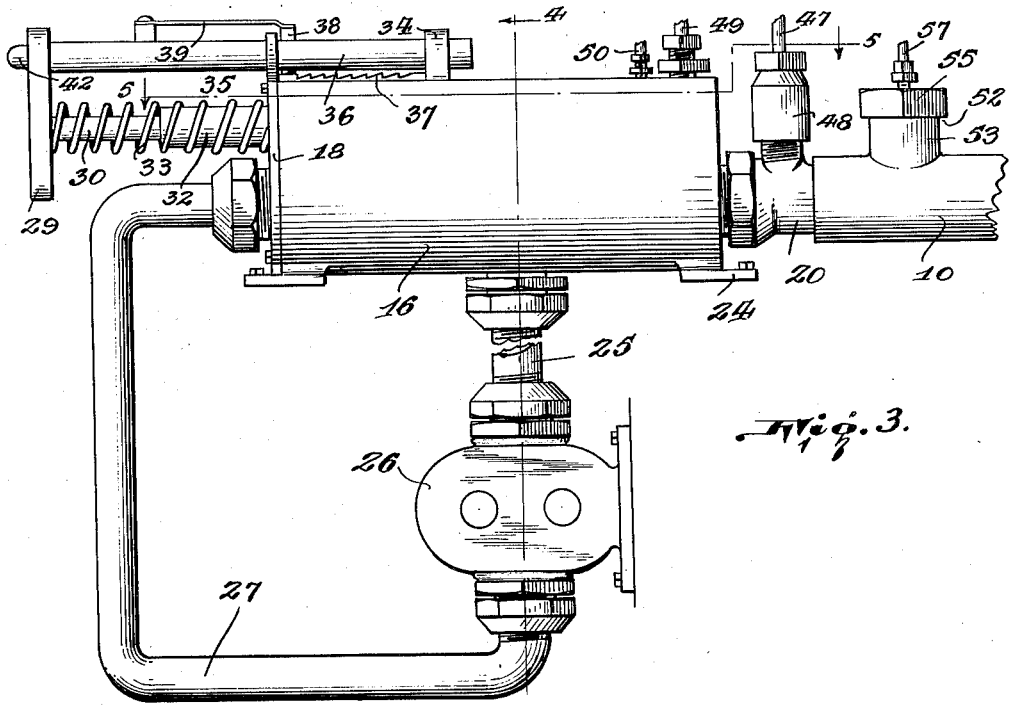
Figure 3 is an elevation of the pump and main cylinder and control.
Figures 4, 5:
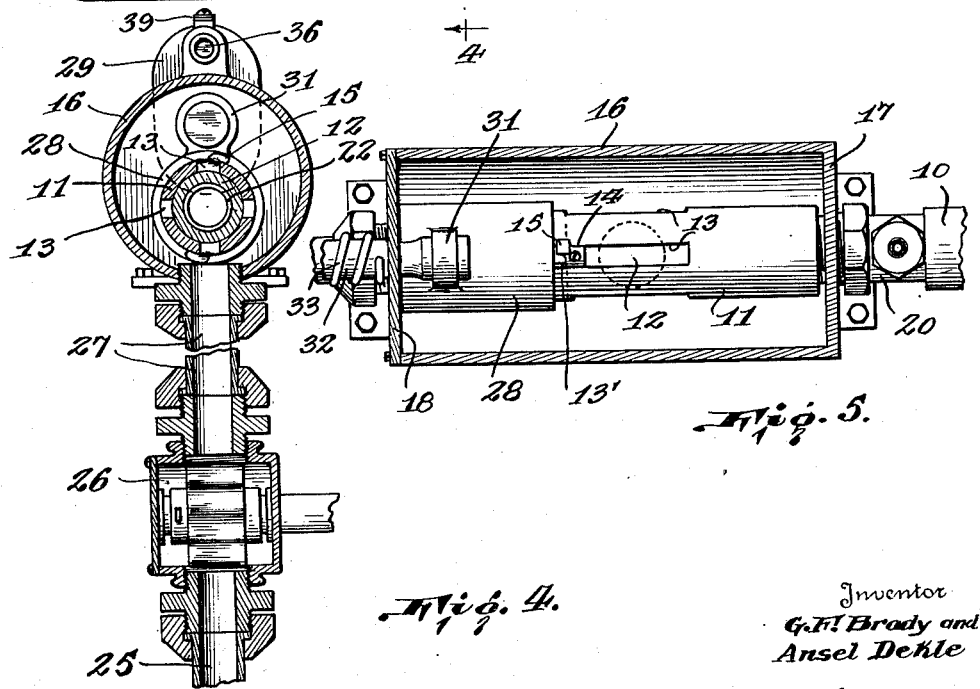
Figure 4 is a cross section on the line 4—4 of Figure 1.
Figure 5 is a horizontal section of the main cylinder.

The device in its present embodiment being specially adapted to hydraulic brakes, and the construction of the latter being well known and understood in the art, the brake structure, other than the main operating fluid conduit will not be shown.

There is shown a main operating or brake fluid conduit or pipe 10, which may lead by usual pipe branches to the standard brake cylinders from a main or operating cylinder 11 in which there reciprocates a piston 12, by which a suitable brake fluid may be compressed in the pipe 10. The piston 12 operates in an uninterrupted right hand end part of the cylinder throughout the piston movement but the head of the piston moves in an extended left hand conduit chamber portion of the cylinder in which conduit portion elongated longitudinal outlet ports or slots 13 are formed, narrowed to form shoulders 13' near their left ends. The piston has at its head distant always from the uninterrupted part of the cylinder, splines 14 slidable in the slots, and formed with outwardly offset laterally reduced longitudinal extensions 15 outwardly of the external wall of the cylinder, for a purpose to be described.

The cylinder is mounted in a chamber 16 which may be a cast body having an integral head 17 at the right into a tapped opening of which a nipple tenon 19 on the open end of the cylinder is screwed, as a mounting, an external nipple 20 on the head 17 being utilized for coupling the pipe 10 in a familiar way. The opposite end of the chamber is closed by a head 18 bolted thereto and the opposite end of the cylinder is tenoned and ported at 21 as an inlet, the tenon being engaged through a suitable opening in this head plate, with suitable gasket or other seal. The tenon element of the cylinder may be separately formed and connected thereto, if desired. The piston 12 is held yieldingly at initial non-compression position by a helical spring 22; the splines 14 engaging the shoulders 13' near the left ends of the slots 13 to limit this relief movement of the piston and so leave the narrow parts of the slots open. The chamber 16 is formed with foot pieces 24 for mounting as required. The slots 13 extend to the left beyond the piston at all positions of the piston and serve as communication between the conduit chamber 11' and chamber 16, which form part of a simple circulatory system in which fluid is taken from the chamber 16 through a pumpintake pipe 25 to the pump 26, the pump delivering the fluid through delivery pipe 27 through the head plate 18 and tenon nipple 21, any usual coupling being utilized for the connections. Preferably the pump is a gear pump, operating in any usual manner from the motor of the vehicle or other power plant.

The cylinder is smoothly finished exteriorly to afford a seat for a reciprocable control sleeve valve 28 slidable on the cylinder, and of sufficient length to nearly cover the slots 13 throughout their length. The sleeve valve is operated by manual or pedal means, a pedal 29 being shown in the present instance, carried on a rod 30 slidable through the head plate of the chamber 16 and connected to a lug 31 on the upper side of the sleeve valve. The rod mounting consists of a bored boss 32 formed integrally on the head plate, a helical spring 33 being confined between the pedal and head yoke. The boss extends within the spring a sufficient distance to serve as a stop for the pedal before the far end of the sleeve valve reaches the distant ends of the slots 13. On the upper side of the chamber 16 a guide lug 34 is formed, and on the head plate 18 a similar one 35, both bored on an axis parallel to the cylinder 11, to receive slidably a tube 36 in which a detent device is mounted, to hold the valve 28 at various stages of operation or to release it, as desired. On the chamber 16 a ratchet bar 37 is mounted having teeth inclined away from the pedal, and on the tube a dog 38 is mounted slidable through the tube to engage the ratchet bar at times, a leaf spring 39 being fixed on the outer side of the dog and attached to the side of the tube as a mounting for the dog and serving to press the latter inward yieldingly. The left end of the tube is exteriorly threaded and screwed tightly into the upper part of the pedal so as to be fixed thereon and to reciprocate therewith. The tube stops short of the face of the pedal. Within the tube there are a number of guide blocks 40 in which there is slidable a rod 41 having a button or release knob 42 adapted to be engaged by the foot of the operator to operate the rod independently of the pedal at times, or to hold the rod in a given position and to be moved with the pedal, a helical spring 43 being confined between the knob and one of the guide blocks 40 so as to hold the button extended yieldingly. The dog 38 is formed with a vertical slot 44 in which the rod reciprocates, and projecting a distance below the rod normally. The rod is formed with a lift cam 45 normally to the left of the dog, with a lift face inclined upwardly from adjacent the dog toward the left, so that when the button 42 is depressed in the pedal the dog is cleared of the ratchet bar. The dog will normally hold the pedal depressed at any stage to which it is forced by the foot of the operator, if the button is not depressed, but by applying the foot to the upper part of the pedal the latter will be released at any time when so desired. Also, if the pedal is operated by pressure on the upper part including the button, the pedal and brake will respond at once to relief movement of the foot. The spring 33 may be comparatively light so that but little effort is required to operate the brake, and the spring 22 should be lighter ordinarily, as it is only required to move the piston when the latter is not opposed by foot pressure on the pedal. The spring 43 should of course be very much lighter than the spring 33, as will be understood.

As is customary in some brake systems, and as is desirable in order to avail of certain functions of my invention in certain forms, a brake-fluid supply or reservoir 46 is provided, having communication by gravity with the pipe 10, through a pipe 47 and delicate check valve 48. The bottom of the reservoir is also connected by pipe 49 to the chamber 16 without any interposed check valve, as no pressure is required in the latter normally. A further vent connection 50 is also formed between the top of the chamber 16 and an intermediate level of the reservoir, for clearing air from the chamber 16, and permit ready flow of oil from the reservoir to the chamber. A vented filler cap 51 is provided at the top of the reservoir.

A special pressure sustainer and compensator device 52 is provided in association with the outlet of the cylinder 11, which in the present instance is shown as a vertical cylinder extension 53 of the conduit 10 in which there is slidable a piston 54, the cylinder 53 being closed by a cap 55, by which a helical spring 56 is confined in the cylinder, bearing on the piston. The latter spring should cause the piston to resist a liquid pressure in the pipe 10 exceeding the normal maximum brake pressure in the pipe 10. From the central part of the cap a vent 57 extends to open into the reservoir 46.

In use, the pump being in operation, and the pedal in released position, the circulating fluid moved by the pump will pass from the chamber 16 through the pipe 25, pump and pipe 27 to the left chamber 11' of the cylinder 11, which is always divided from the cylinder proper 11 by the piston 12. The fluid then passes through the slots 13 to the chamber 16 and again to the pipe 25 whereby the orbital or circulatory movement is repeated. Any pressure which may tend to develop in the left chamber 11' will be relieved by reason of the sleeve valve being at the left extreme of its movement, uncovering the slots 13 and also by reason of the piston being stopped short of the left ends of the slots sufficiently to permit passage of the fluid without material compression of the spring 22. In case it is desired to apply the brake the pedal 29 is pushed forwardly to the right by the operator. This restricts the movement of fluid through the slots, and develops a hydrostatic pressure in the left chamber 11' which moves the piston 12 to the right, compressing the spring 22 until, if the pedal movement is stopped, the movement of the piston opens the slots sufficiently to relieve the hydrostatic pressure until counterbalanced by the spring 22. Movement of the piston of course compresses the brake operating fluid in pipe 10 in proportion to the extent of movement of the piston and resistance of the brake parts. If a further application of the brake or greater force is desired, the pedal is simply pressed further, and the pressure in the left chamber will thereby be maintained with consequent further movement of the piston and compression of the brake fluid until the pedal is stopped. In initial stages of movement of the valve 28 high pressure in the brake fluid in pipe 10 will not and can not be developed because the slots 13 permit passage of the circulatory fluid with relative freedom. When the sleeve valve is moved over the further parts of the slots 13, however, a greater pressure may be developed because the resistance of the spring 22 acting against the piston causes the opening of the slots to be restricted more and thereby greater pressure acts on the piston, with consequent higher pressure in the pipe 10 if the brake shoes are engaging. This effect is manifest progressively with movement of the sleeve valve, until at the extreme right hand position of the sleeve a maximum retardance of the fluid flow is effected, due to action of the spring 22 pressing the piston toward the left.

At no time, however, is the flow of fluid through the slots 13 completely checked, as the extensions 15 on the splines are engaged by the sleeve if the latter is pressed far enough, and the piston head held away from the valve.

The brake pressure may be moderated while braking action is maintained, by keeping the foot engaged with the button 42 and allowing the pedal to return toward initial position, thereby opening the slots 13 more, and allowing the piston to move toward relief position. By keeping the foot clear of the button, the brake may be kept applied, at any desired stage.

Should the motor of the vehicle not be operating, the engagement of the sleeve with the spline extensions will operate the piston, but will require sufficient physical effort to produce the necessary hydrostatic pressures in pipe 10.

Also, in case the brake is applied while the motor is in operation, and the pump pressures utilized to apply the brake, if the brake is retained in applied position by means of the dog 38, and the motor stopped, the brake will be kept applied by engagement of the sleeve 28 with the spline extensions.

In case of leakage of the brake fluid in pipe 10 from any point in the brake system, including the piston and cylinder, on relief operation and return of the piston by the spring 22, a fresh supply will be drawn from the reservoir past check valve 48 into the pipe 10.

The cylinder and piston are preferably proportioned so that full or maximum brake pressure may be attained while the piston yet may be moved a substantial distance under control of the pedal and valve 28, say, for one cubic inch displacement. The device functions in such manner that if the maximum brake pipe pressure is attained and further movement of the piston effected, the spring 56 yields, allowing the piston to accommodate the additionally displaced brake fluid until the piston has reached its limit of movement. Should there then be any leakage around the piston, the piston 54 will return by expansion of the spring 56 and maintain the pressure. Adjustment of the force of the spring 56 may be made by replacement, and the strength will vary with the nature of the service. Fifty pounds per square inch would be normal for a passenger vehicle for family use.

It will be understood that for lever-operated brake systems, a rod may be connected to the piston 12 to function as an equivalent of the hydraulic system and extended through usual supports and guides. The stops 15 may, of course, be omitted if desired, so that the sleeve valve would be capable of overlapping the piston momentarily, at least in the early stages of movement of the piston, and if the stops 15 are omitted, there would still be provided a final clearance over the slots, by reason of the boss stopping the pedal and sleeve, while the piston moves a short distance in its final movement toward the right.

We claim:—

1. A servo-system comprising a circulatory fluid system consisting of a conduit having an inlet at one part and outlet ports in its sides elongated longitudinally and narrowed at their ends next adjacent the inlet to define shoulders, a piston slidable in the cylinder, said piston having a spline element disposed in the outlet ports and movable with the piston throughout the length of the wider portion of the slots, said spline being of a width to contact the shoulders, means to transmit power from the piston, a valve slidable over the outlet ports, and means for operating the valve.

2. A servo-system comprising a circulatory fluid system consisting of a conduit including a cylinder having inlets and outlets in the form of longitudinal slots in the walls of the cylinder, a piston slidable in the cylinder, said slots being narrow at their parts adjacent initial position of the piston and wide in the direction of power transmission from the piston, said piston having a spline element disposed within the wide portions of the slots, said splines being of a width to engage the narrow portion of the slots, a valve longitudinally slidable over the slots, means to operate the valve at will, and a power transmitting connection with the piston.

3. A servo-system comprising a circulatory fluid system consisting of a conduit having an inlet at one part and outlet ports in its sides elongated longitudinally and narrowed at their ends next adjacent the inlet, a piston slidable in the cylinder, said piston having a spline element disposed in the outlet ports and movable with the piston throughout the length of the wider portion of the slots and of a width to engage the narrow portion of the slots, means to transmit power from the piston, a valve slidable over the outlet ports, means for operating the valve, and a multiple stage detent device associated with the valve operating means, said detent device being releasable at will.

4. A servo-system comprising a circulatory fluid system consisting of a cylinder having an inlet port at one part and outlet ports in its sides, said outlet ports being elongated longitudinally and narrowed at their ends adjacent the inlet, a piston slidable in the cylinder, splines on the piston slidable in the wide portion of the slots and of a width to engage the narrow portions thereof, a sleeve valve slidably fitted to the cylinder for controlling the outlet ports, said splines having a projection in the path of the sleeve to be contacted thereby, whereby to maintain a limited opening of the ports.

5. A servo-system comprising a circulatory fluid system consisting of a conduit including a cylinder having an inlet at one part and a lateral outlet spaced longitudinally therefrom and elongated longitudinally of the cylinder, a piston slidable in the cylinder along said port and to extend therebeyond opposite said inlet, a sleeve valve slidable over the outlet, means for operating the valve at will, and a stop on the piston slidable in the outlet and projecting into the path of the valve to engage the valve and hold the latter short of the piston.

GEORGE F. BRADY.
ANSEL DEKLE.